(12) United States Patent
Moreira-Matias et al.

(10) Patent No.: US 10,453,020 B2
(45) Date of Patent: Oct. 22, 2019

(54) METHOD FOR PROVIDING A TYPICAL LOAD PROFILE OF A VEHICLE FOR A PUBLIC TRANSPORT SYSTEM

(71) Applicant: NEC Europe Ltd., Heidelberg (DE)

(72) Inventors: Luis Moreira-Matias, Heidelberg (DE); Oded Cats, Rotterdam (NL)

(73) Assignee: NEC CORPORATION, Tokyo (JP)

( * ) Notice: Subject to any disclaimer, the term of this patent is extended or adjusted under 35 U.S.C. 154(b) by 178 days.

(21) Appl. No.: 15/549,386

(22) PCT Filed: Jul. 31, 2015

(86) PCT No.: PCT/EP2015/067729
§ 371 (c)(1),
(2) Date: Aug. 8, 2017

(87) PCT Pub. No.: WO2017/020940
PCT Pub. Date: Feb. 9, 2017

(65) Prior Publication Data
US 2018/0039932 A1 Feb. 8, 2018

(51) Int. Cl.
*G06Q 10/08* (2012.01)
*G06Q 50/30* (2012.01)

(52) U.S. Cl.
CPC ............ *G06Q 10/08* (2013.01); *G06Q 50/30* (2013.01)

(58) Field of Classification Search
CPC ................. G06Q 10/08; G06Q 50/30
See application file for complete search history.

(56) References Cited

U.S. PATENT DOCUMENTS

| | | | |
|---|---|---|---|
| 6,317,686 B1* | 11/2001 | Ran | G01C 21/3691 |
| | | | 701/117 |
| 9,177,473 B2* | 11/2015 | Min | G08G 1/123 |
| 9,536,210 B2* | 1/2017 | Handley | G06Q 10/04 |
| 9,836,979 B2* | 12/2017 | Handley | G06Q 30/0202 |
| 10,019,671 B2* | 7/2018 | Ulloa Paredes | G06N 5/02 |
| 2003/0135304 A1* | 7/2003 | Sroub | G06Q 10/08 |
| | | | 701/1 |
| 2009/0106101 A1* | 4/2009 | Green | G06Q 10/08 |
| | | | 705/14.23 |
| 2010/0185486 A1* | 7/2010 | Barker | G06Q 30/0202 |
| | | | 705/7.31 |

(Continued)

*Primary Examiner* — Courtney D Heinle
(74) *Attorney, Agent, or Firm* — Leydig, Voit & Mayer, Ltd.

(57) ABSTRACT

A method for providing a typical load profile of a vehicle includes computing dwell times and maximum load stops, wherein a maximum load stop indicates a stop having a largest load on a route for a trip using route information and vehicle scheduling information based on automatic vehicle location data, computing one or more trip load profiles by identifying a load progression rate by performing a local regression procedure dividing the route into subsections such that the loads between adjacent subsections can be represented by a linear function on input of the computed maximum load, the computed dwell times, and maximum load stops, and constraining the identified load progression rate to an admissible value by evaluating the rate load progression with regard to historical dwell times and the computed maximum load stops. The method further includes computing the typical load profile based on load profiles of computed trips.

15 Claims, 2 Drawing Sheets

(56) References Cited

U.S. PATENT DOCUMENTS

| | | | | |
|---|---|---|---|---|
| 2010/0299177 A1* | 11/2010 | Buczkowski | .......... | G06Q 10/06 |
| | | | | 705/7.13 |
| 2012/0253863 A1* | 10/2012 | Forstall | ................. | G08G 1/202 |
| | | | | 705/7.12 |
| 2013/0197794 A1* | 8/2013 | Bast | ................... | G01C 21/3423 |
| | | | | 701/410 |
| 2014/0035921 A1* | 2/2014 | Yeh | ...................... | G06T 11/206 |
| | | | | 345/440 |
| 2015/0348068 A1* | 12/2015 | Fei | .................... | G06O 30/0202 |
| | | | | 705/7.31 |
| 2016/0342946 A1* | 11/2016 | Herraiz Herraiz | ..... | G06Q 10/08 |
| 2017/0270790 A1* | 9/2017 | Neiger | .................. | G08G 1/127 |
| 2018/0032928 A1* | 2/2018 | Li | ........................ | G06Q 10/06 |

* cited by examiner

METHOD FOR PROVIDING A TYPICAL LOAD PROFILE OF A VEHICLE FOR A PUBLIC TRANSPORT SYSTEM

CROSS REFERENCE TO RELATED APPLICATIONS

This application is a U.S. National Stage Application under 35 U.S.C. § 371 of International Application No. PCT/EP2015/067729 filed on Jul. 31, 2015. The International Application was published in English on Feb. 9, 2017 as WO 2017/020940 A1 under PCT Article 21(2).

FIELD

The present invention relates to a method for providing a typical load profile of a vehicle for a public transport system for a vehicle's route. The present invention further relates to a system for providing a typical load profile of a vehicle for a public transport system for a vehicle's route.

BACKGROUND

Public transport systems have to be adapted to the needs of the persons using said system. One of the major parameters for optimizing a public transport system is the passenger demand. Over the last decades, mass transport operators worldwide relied on passenger surveys to understand their mobility needs and change their planning and/or control strategies for the public transport system accordingly.

Recently the massive introduction of inexpensive automated data collectors such as the automatic vehicle location, 'AVL', and the automatic passenger counting, 'APC', enable to collect data automatically which then may be used for planning or controlling a public transport system.

Such planning and control methods and systems for public transport systems are for example disclosed in US 2009/0106101 or in US 2013/0197794.

Conventionally automatic passenger counting is used for analyzing the passenger demand. Inter alia automatic passenger counting data can be collected by smartcard data including stop-based or trip-based fares as disclosed in the non-patent literature of Munizaga, M. and C. Palma, Estimation of a disaggregate multimodal public transport Origin—Destination matrix from passive smartcard data from Santiago, Chile. Transportation Research Part C: Emerging Technologies, Vol. 24, 2012, pp. 9-18.

A second option is to use vehicle's weight sensors as disclosed in the non-patent literature of Nielsen, B., L. Frolich, O. Nielsen, and D. Filges, Estimating passenger numbers in trains using existing weighing capabilities. Transportmetrica A: Transport Science, Vol. 10, No. 6, 23 2014, pp. 502-517 or as a third option to use video surveillance footages as disclosed in the non-patent literature of Chen, C., Y. Chang, T. Chen, and D. Wang, People Counting System for Getting In/Out of a Bus Based on Video Processing. In Intelligent Systems Design and Applications, 2008. ISDA '08. Eighth International Conference on, 2008, Vol. 3, pp. 565-569.

The analysis of these data of all the collection options includes a certain degree of uncertainty lying inter alia on the resource requirements to adequately deploy the corresponding systems on the entire network and fleet, i.e. financial related, which costs are considerably higher than automatic vehicle location data as shown in the non-patent literature of Nielsen, B., L. Frolich, O. Nielsen, and D. Filges, Estimating passenger numbers in trains using existing weighing capabilities. Transportmetrica A: Transport Science, Vol. 10, No. 6, 23 2014, pp. 502-517. For example to collect automatic passenger counting data RFID readers have to be bought and installed as well as the information system has to be bought and installed to adequately collect and store the collected information. Alternatively the public transport fleets with regard to the second option have to be provided with weight sensors or the stops—for the third option—with video cameras on every stop. Further to the second and third option software has to be bought and installed being able to transform the collected data in form of pictures into demand-oriented information for example disclosed in the non-patent literature of Nielsen, B., L. Frolich, O. Nielsen, and D. Filges, Estimating passenger numbers in trains using existing weighing capabilities. Transportmetrica A: Transport Science, Vol. 10, No. 6, 23 2014, pp. 502-517.

SUMMARY

In an embodiment, the present invention provides a method for providing a typical load profile of a vehicle for a public transport system for a vehicle's route, wherein the vehicle performs at least one trip along the route, wherein a trip includes a number of stops with respective dwell times, and wherein a trip load profile indicates capacity utilization on a trip along a route. The method includes computing, by a first computing device, dwell times and maximum load stops, wherein a maximum load stop indicates a stop having a largest load on the route for a trip using route information and vehicle scheduling information based on automatic vehicle location data, computing, by a second computing device, one or more trip load profiles by identifying a load progression rate by performing a local regression procedure dividing the route into subsections such that the loads between adjacent subsections can be represented by a linear function on input of the computed maximum load, the computed dwell times, and maximum load stops, and constraining the identified load progression rate to an admissible value by evaluating the rate load progression with regard to historical dwell times and the computed maximum load stops. The method further includes computing, by a third computing device, the typical load profile based on load profiles of one or more computed trips.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide methods for providing a typical load profile of a vehicle for a public transport system for a vehicle's route, wherein said vehicle performs at least one trip along the route, wherein a trip includes a number of stops with respective dwell times and wherein a trip load profile indicates capacity utilization on a trip along a route.

Embodiments of the present invention further provide systems for providing a typical load profile of a vehicle for a public transport system for a vehicle's route, wherein said vehicle is adapted to perform at least one trip along the route, wherein a trip includes a number of stops with respective dwell times and wherein a load profile indicates capacity utilization on a trip along a route.

Methods and systems are described herein for providing typical vehicle load profiles, i.e. the amount of passengers within a vehicle throughout all the route stops, with less cost than by conventional systems and for providing vehicle load profiles that are more flexible, i.e. can serve multiple purposes.

In an embodiment the present invention provides a method for providing a typical load profile of a vehicle for a public transport system for a vehicle's route, wherein said vehicle performs at least one trip along the route, wherein a trip includes a number of stops with respective dwell times and wherein a trip load profile indicates capacity utilization on a trip along a route, said method comprising the steps of:
a) Computing, by a first computing device, dwell times and maximum load stops wherein a maximum load stop indicating the stop having the largest load on said route for a trip using route information and vehicle scheduling information based on automatic vehicle location data
b) Computing, by a second computing device, one or more trip load profiles, a trip load profile being computed by
   Identifying a load progression rate by performing a local regression procedure diving the route into subsections such that the loads between adjacent subsections can be represented by a linear function on input of said computed maximum load, said computed dwell times and maximum load stops and
   Constraining said identified load progression rate to an admissible value by evaluating said rate load progression with regard to historical dwell times and said computed maximum load stops, and
c) Computing, by a third computing device said typical load profile based on one or more computed trip's load profiles.

Said method may be performed in a memory available to one or more computing devices.

In a further embodiment the present invention provides a system for providing a typical load profile of a vehicle for a public transport system for a vehicle's route, wherein said vehicle is adapted to perform at least one trip along the route, wherein a trip includes a number of stops with respective dwell times and wherein a load profile indicates capacity utilization on a trip along a route, said system comprising:
a) A first computing device adapted to compute dwell times and maximum load stops wherein a maximum load stop indicating the stop having the largest load on said route for a trip using route information and vehicle scheduling information
b) A second computing device adapted to compute one or more trip load profiles, a trip load profile being computed by:
   Identifying a load progression rate by performing a local regression procedure diving the route into subsections such that the loads between adjacent subsections can be represented by a linear function on input of said computed maximum load, said computed dwell times and maximum load stops and
   Constraining said identified load progression rate to an admissible value by evaluating said load progression rate with regard to historical dwell times and said computed maximum load stops, and
c) A third computing device adapted to compute said typical load profile based on one or more computed trip's load profiles.

Said system may be provided in form of a single computation device like a computer or the like.

In a further embodiment the present invention provides a non-transitory computer readable medium storing a program causing one or more computers to execute a process for providing a typical load profile, of a vehicle for a public transport system for a vehicle's route, wherein said vehicle is adapted to perform at least one trip along the route, wherein a trip includes a number of stops with respective dwell times and wherein a load profile indicates capacity utilization on a trip along a route, said process comprising the steps of:
a) Computing, by a first computing device, dwell times and maximum load stops, wherein a maximum load stop indicating the stop having the largest load on said route for a trip using route information and vehicle scheduling information based on automatic vehicle location data
b) Computing, by a second computing device, one or more trip load profiles, a trip load profile being computed by
   Identifying a load progression rate by performing a local regression procedure diving the route into subsections such that the loads between adjacent subsections can be represented by a linear function on input of said computed maximum load, said computed dwell times and maximum load stops and
   Constraining said identified load progression rate to an admissible value by evaluating said rate load progression with regard to historical dwell times and said computed maximum load stops, and
c) Computing, by a third computing device, said typical load profile based on one or more computed trip's load profiles.

At least one embodiment of the present invention has the advantage that the use of automatic vehicle location data is much cheaper than automatic passenger counting data, since AVL systems are considerably cheaper. Moreover automatic vehicle location systems may serve multiple purposes such as fleet tracking, schedule planning, operational control, event logging, etc. Even further they are widely spread along mass transit fleets worldwide so a high availability of automatic vehicle location data is provided. APC data may be included or considered additionally when providing a typical load profile in case corresponding systems have been already installed to enhance the precision of a typical load profile.

The term "load profile" can be understood as the number of passengers inside a vehicle along the entire route wherein the number of passengers may vary along the route. The term "trip load profile" is the load profile for a single trip along the entire route.

The term "vehicle" is to be understood in its broadest sense and can refer for example to cars, busses, trains, etc., i.e. in general to any moveable object adapted to transport one or more passengers.

The term "route information" can refer to information or data about a route, for example positions of way points along the route or the like.

The term "vehicle scheduling information" includes information or data about the vehicle travelling along a route based on a schedule, for example a vehicle is scheduled to be a certain way points along the route at certain times. Said route information and said vehicle scheduling information may be collected in intervals of 30 s or less, of 15 s or less, of 10 s or less or of 5 s or less.

The term "vehicle location data" can refer to data with which the location of a vehicle can be directly or indirectly determined. The term "automatic" in connection with vehicle location data refers in particular in the claims, preferably in the description, to vehicle location data which is collected automatically in certain time intervals. In particular said term refers to AVL data. For instance, vehicle location data refers to GPS data provided by GPS modules within vehicles. GPS data include three-dimensional location coordinates and can optionally provide a time coordinate. GPS data may also refer to data provided by a differential GPS system providing a higher accuracy, i.e. smaller errors in location and time data. For example embodiments of the invention may require a GPS position error of 15 m or smaller, of 10 m or smaller or of 5 m or smaller. For example embodiments of the invention may require a GPS time error of 30 s or smaller, of 10 s or smaller, of 5 s or smaller, or of is or smaller.

The term "load progression rate" can refer to a first-order derivative of the function representing the load along the route.

The term "historic" with regard to other terms, for example "dwell time" can refer to corresponding dwell times which have been already obtained and can be used for a method and system according to an embodiment of the present invention.

The term "timetable information" can represent parameters of historic and/or current timetables for said vehicle, for example the scheduling times, the number of stops along the route, etc.

The term "timetable generation" can refer to information which is used for example by an operator to create timetable for a public transport system along a route.

The term "demand" can refer to a demand of passengers for vehicles in the public transport system.

The term "local regression procedure" can refer to a regression in a mathematical sense which does not fit data globally but locally in such a way that subspaces are determined whose function, e.g. loads, follow linear functions, for example constantly increasing or decreasing along a number of stops.

The term "first computing device", "second computing device", "third computing device", etc. can each refer to a device adapted to perform computing like a personal computer, a tablet, a mobile phone, a server, or the like and comprises one or more processors having one or more cores and may be connectable to a memory for storing an application which is adapted to perform corresponding steps of one or more of the embodiments of the present invention. Any application may be software based and/or hardware based installed in the memory on which the processor(s) can work on. The computing devices may be adapted in such a way that the corresponding steps to be computed are performed in an optimized way. For instance different steps may be performed in parallel with a single processor on different of its cores. Further the first, second and third computing device may be identical forming a single computing device.

The terms "alighting" and "deboarding" are used synonymously throughout the description.

The term "computer readable medium" may refer to any kind of medium, which can be used together with a computation device or computer and on which information can be stored. Said information may be any kind of data which can be read into a memory of a computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM. EEPROM or the like.

Timetable information representing parameters of historic and/or current timetables for said vehicle may be included into said vehicle scheduling information. This enables a broader database for vehicle scheduling information resulting in a typical load profile having a higher precision, i.e. fits better to real data.

Said timetable information may be generated by evaluating timetable generation and extracting meta parameters of said evaluated timetable generation like desired vehicle occupancy, vehicle capacity or the like. This enable a more precise determination of the dwell times and the maximum load stops since not only the scheduling information of the vehicle is included but also the corresponding timetables and the information which has been used to generate such a timetable.

Demand profiles used for generating said timetables may be obtained and these demand profiles per trip may be decomposed using averaged real headways between two trips. This enables in an easy way to obtain the maximum of a trip's load by a maximum load point scheduling procedure. Such a procedure is e.g. disclosed in the non-patent literature of Ceder, A. and L. Philibert, Transit Timetables Resulting in Even Maximum Load on Individual Vehicles. Intelligent Transportation Systems, IEEE Transactions on, Vol. 15, No. 6, 2014.

Said dwell times may be decomposed into passenger information and vehicle information, including at least one of number of boardings, number of deboardings, vehicle dead time, boarding time, deboarding time for said vehicle. This enables in an easy way to use them in regression procedures together with historic and/or current data thus leading to a reliable typical load profile.

A maximum load stop is computed by determining the stop having the maximum dwell time during a trip. This enables in a fast and easy way to determine the maximum load stop. The determination of the stop with a maximum dwell time may only be selected when the dwell time is sufficiently large, i.e. is to be considered a maximum. This may be defined by a corresponding parameter. Another option is to select the stop as maximum load stop which corresponds to an optimal split between the sums of dwell times on up- and downstream stops Said local regression procedure may be based on LOESS. LOESS as for example disclosed in the non-patent literature of Cleveland, W., Robust locally weighted regression and smoothing scatterplots. Journal of the American statistical association, Vol. 74, No. 368, 1979, pp. 829-836. is a so-called local scatterplot smoothing regression procedure combining linear and non-linear regression methods in an easy and simple way. Thus, load progression rate can be identified fast and reliably.

Said constraining of b) is performed using a bandwidth indicating a minimum and maximum admissible loads and a progression rate function decomposing the dwell time and the boarding time and deboarding time and using said bandwidth and said progression rate function to update said trip load profile incrementally. This enables to fit the regression output to realistic values dating, measured or provided by historic dwell times.

For computing said typical load profile a Euclidean distance may be computed between each of said trip profiles and an average load profile and the one having the smallest distance is selected as typical load profile. This represents the typical trip load profile within the selected period at its best.

When decomposing said dwell times the boarding time and the deboarding time for passengers for the first and last stop of a trip may be computed separately using the dwell times and the maximum load stop. This enables a handling the first and the last stop separately taking into account the special characteristics of the start and end point of a trip, for example when starting no persons are deboarding.

Said typical load profile may be determined in a peak hour of interest. The typical load profile in a peak hour is more interesting for an operator since capacity limitations for example may be applied during peak hours and therefore more precise scheduling for example for busses with respect to the typical load profile has to be performed avoiding an over- or underprovisioning of resources.

Figure 1:
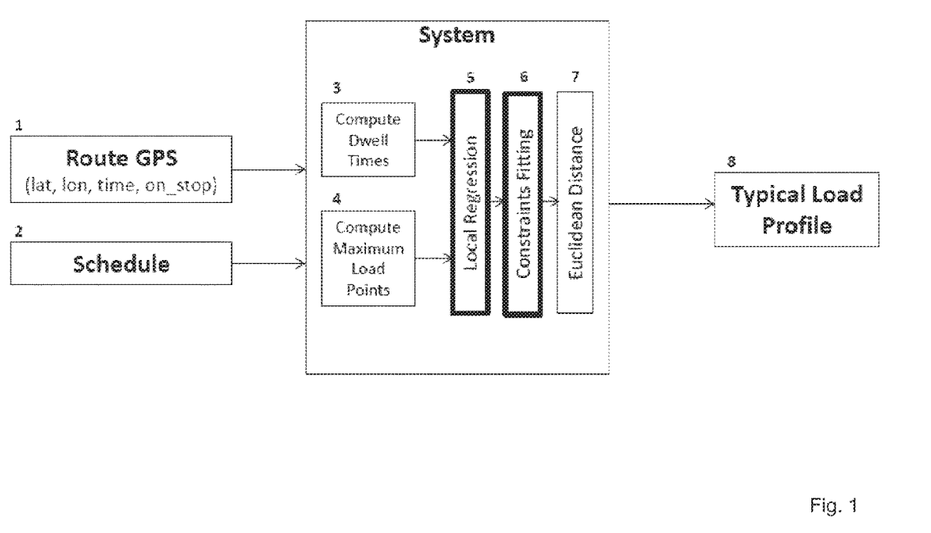
FIG. 1 shows schematically a system according to an embodiment of the present invention.

FIG. 1 shows a system according to an embodiment of the present invention. In FIG. 1 a system diagram of a system according to an embodiment is shown. On input of routing information like GPS data, reference sign 1, along with schedule data, for example a defined schedule, reference sign 2, dwell times are computed as well as the maximum load points (reference signs 3 and 4). Then a load profile estimation method is performed through a constraint local regression procedure (reference sign 5). When performing said local regression procedure the first-order derivative of the loads, i.e. if there are going up or down, are identified, in particular through a subset of trips.

In a next step 6 an incremental procedure is performed to fit the regression output to admissible values starting from the computed dwell times (reference sign 3) along with a maximum load points (reference sign 4). This incrementally follows the behavior of a vehicle, where the loads on a stop N are the loads of the stop N−1 plus the delta observed on stop N. When the Euclidean distance (reference sign 7) is determined for an average of the trip load profile and the corresponding determined trip load profiles and then based on the result of the determined Euclidean distances the trip load profile having the smallest Euclidean distance is selected as typical load profile for said route during a peak hour period of interest.

Figure 2:
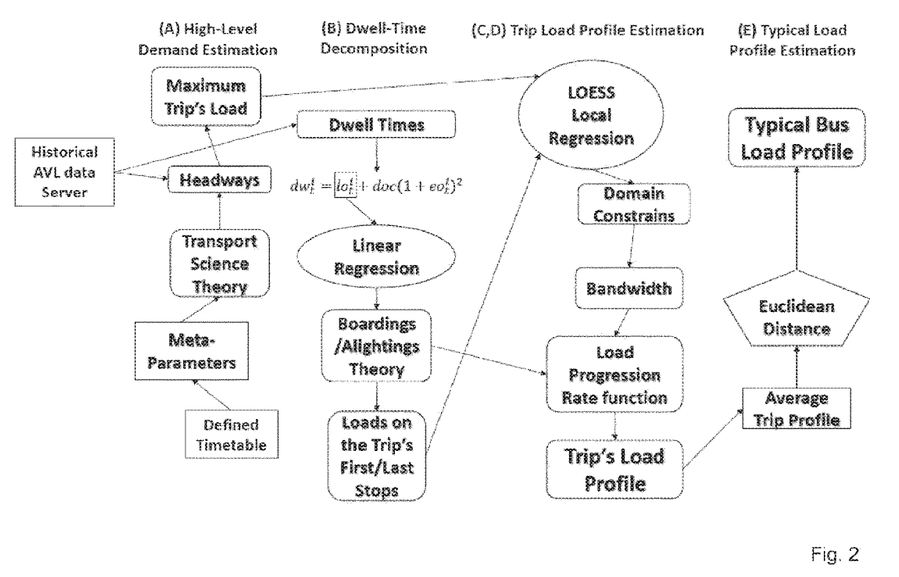
FIG. 2 shows a method according to an embodiment of the present invention.

FIG. 2 shows a method according to an embodiment of the present invention. In FIG. 2 four steps are shown for obtaining, for example estimate a typical load profile. In a first step A a high-level demand estimation is performed using historical automatic vehicle location data from a corresponding server. In a next step B dwell-time decomposition is performed. Based on the high-level demand estimation A and the dwell-time decomposition B a trip load profile is estimated in a step C. Based on said estimation—step C—a typical load profile is estimated in step D.

In detail the high-level demand estimation—step A—at least partly tries to reverse the scheduling engineering process for a timetable for instance to obtain the demand profiles that were used to generate the running timetable. This is performed by getting some information about the procedure used to generate such schedule, such as the desired vehicle occupancy or its capacity to obtain the total demand per period of time, e.g. number of passengers running the route per hour). these demand numbers per trip are decomposed using the concept of local headways (i.e. the averaged real headways between two consecutive trips). These decomposed numbers are then used to obtain the maximum trip's load, e.g. through the data driven version of the maximum load point scheduling procedure proposed in the non-patent literature of Richardson, A., E. Ampt, and A. Meyburg, Survey methods for transport planning. Eucalyptus Press Melbourne, 1995.

In more detail the high-level demand profiles are estimated as follows: Commonly, a transit timetable is defined by multiple folds of different frequencies as shown below in equation (1). This definition is made using demand profiles obtained through surveys and/or direct observation. Two different ways of determining such frequencies may be used: (i) stop-based and (ii) route-based. The latter one requires checking the demand information on every stop of the route. On the other hand, the stop-based approach relies on the division between the maximum-load point (e.g. the bus stop traversed when the bus which contained) and the desired occupancy during a given period of time (which should ideally have the same bus frequency defined within). It is possible to determine the desired frequency for a given period j of length J (e.g. J=60 minutes), i.e. $F_j$ as follows (1):

$$F_j = \max\left(\frac{de_m(j)}{d_{oj}}, F_{min j}\right), \forall j$$

where $de_m(j)$ stands for the maximum demand value of any bus running this particular route during this period and $d_{oj}$ for the desired occupancy under the same conditions. Such an open definition does not allow to infer much about the demand patterns. In order to extract such patterns, propose a set of assumptions have to be made which constrain the previous equation to meet a particular working scenario.

The following assumptions are made: The entire fleet have an equal capacity of c passengers; The $d_{oj}$ is defined by a constant value 0<D<1 (i.e. percentage-wise definition) for every and any periods j or routes within the peak hours; The value of D is known or given beforehand; The frequency setting in place was obtained through a maximum-load point procedure where $l_{mj}$—the maximum expected load for a given trip j—is a constant value throughout the days; The frequency necessary to meet the load/occupancy constraints on the peak hours is never lower than $F_{min\ j}$;

Based on these assumptions, it is possible to re-write the equation 1 as follows:

$$de_m(j) = c \cdot D \cdot F_j \equiv c \cdot D \cdot \frac{3600}{H_j}$$

where $H_j$ stands for the average planned headway during the period j (in seconds). With this the scope is limited to trips that occur on peak hours. Even so, the expected maximum value on each peak hour period can be inferred based on the schedule. A direct reversion of this principle may be incorrect since the headway distribution that generated such $H_j$ beforehand (e.g. if it follows a Gaussian distribution, the mean would be equal to the median, but such equality may not be true if it follows a chi-squared or a beta one) m is not known.

To tackle such issue, the concept of demand locality is introduced. Let $l_m(j, t)$ be the maximum bus load of a given trip t during the period j. It can be obtained using the headways measured between t and t−1, t+1—where lh(j, t) denotes such local headway computation. Consequently, it is possible to compute a value of $l_m(j, t)$ as follows $$l_m(j, t) = c \cdot D \cdot F_j \equiv c \cdot D \cdot \frac{3600}{lh(t)}$$

$$lh(t) = \sum_{i=1}^{h} \frac{h_{t-1,t}^i + h_{t,t+1}^i}{2s}$$

where $h_{t-1,t}^i$ stands for the real headway between the trips t and t−1 measured in the bus stop i.

After determining the maximum load of a trip t, i.e. $l_m(j, t)$, the maximum load point $\tau(t)$—which stands for the bus stop where the bus running the trip t experienced its largest load has to be determined. It can be defined as $$\tau(t) = i : l_t^i = \max(l_t^k), \forall k \in \{1 \ldots s\}$$

The real bus loading values, i.e $l_t = \{l_t^1, l_t^2, \ldots l_t^s\}$ are unknown. To do such mapping, the dwell times are used computed through the acquired AVL data according to step B:

In step B the dwell-time decomposition is performed by decomposing the dwell-time into multiple components, including boardings, alightings/deboardings and vehicle dead time. This decomposition enables to model the dwell-time using available data samples and linear regression procedures by assuming the absence of boardings/deboardings on the last/first stops.

In detail the dwell-time decomposition is performed as follows: Assuming simultaneous boardings and alightings, it is possible to decompose the dwell time using the following linear expression (11):

$$dw_t^i = \max(a \cdot A_t^i, b \cdot B_t^i) + doc_t^i + un_t^i + cf_t^i$$

where a, b are the average alighting/boarding time (i.e. constant for all stops), $A_t^i$, $B_t^i$ represent the number of alightings/boardings, $doc_t^i$ is the time spent to open and close the doors, $un_t^i$ stands for the time spent on unexpected activities (e.g. wheelchair lifts) and $cf_t^i$ models the delays introduced by the additional interactions between passengers in crowded situations.

The sum of the last three factors are often known as dead time, i.e. $dt_t^i$. For simplicity, $un_t^i$ is ignored from now on (i.e. $un_t^i=0$) and $doc_t^i$ is assumed to be a constant value, i.e. $doc_t^i=doc$, $\forall i, t$. Consequently, $dt_t^i=doc+cf_t^i$. In most of the pairs t, i, $cf_t^i \cong 0$. Hereby, this friction effect is formulated as a penalty factor to the usually constant dwell time (i.e. doc). Finally, max ($a \cdot A_t^i$, $b \cdot B_t^i$) is defined as the loading time—denoted as $lo_t^i$. Using such definitions, it is possible to re-write the eq. 6 as follows:

$$dw_t^i = lo_t^i + \left(doc \cdot (1 + eo_t^i)^2\right)$$

$$eo_t^i = \begin{cases} \frac{lo_t^i - D}{100} & \text{if } lo_t^i \geq D \\ 0 & \text{otherwise} \end{cases}, \forall i \in j$$

where $eo_t^i$ stands for the penalty factor to apply to doc resulting from the abovementioned friction effect.

Naturally, the bus load of a trip t after traversing a given stop s is given the sum of all the previous boardings bo and alightings al as $l_t^i = \tau_k^a = 1 \, bo_t^k - al_t^k$. However, empirically, it is known that $l_t^i = bo_t^1$ as $al_t^1 = 0$. Similarly, it is possible to conclude that $l_t^s = 0$ where $al_t^s = l_t^{s-1}$. In fact, based on empirical findings by the following assumption can be established: There are no alightings on the first stops of a route neither boardings on the last ones.

Even considering that those are hard constrains, their meaning is relaxed by assuming that even if such boardings/alightings exist on a very small scale, they are not relevant though. The concept of first/last stops of a given route is defined on a percentagewise fashion by two user-defined parameters: $0 < \phi f \ll 1$ and $0 < \phi l \ll 1$, respectively. Naturally, this assumption is equally useful to compute a, b and doc as they allow to isolate each one of these components individually.

By assuming that $eo_t^i = 0$ for all the bus stops i included in the first/last bus stops sets, doc can be obtained through simple linear regression. Empirically, it is known that a, $b \in N^2 < 10$ $a < 10^2 < b < 10$. The dwell time for the first stops can be obtained as $dw_t^i = (b \cdot bo_t^i) + doc_b$, while the simplified version of eq. 6 can be obtained as $dw_t^i = (a \cdot al_t^i) + doc_a$. a is obtained using only the dwell times of the last stops while b uses just the samples collected from the first stops. The values of a, b must be constrained to the range previously defined. They can be computed using any linear regression algorithm which aims to minimize $R^2$ (e.g. linear least squares (12)). Finally, doc results of averaging the two constants obtained through the two regression processes as $doc=(doc_a+doc_b)/2$.

The computation of a, b and doc enables to find the $bo_t^i$ and $al_t^i$ for the first/last stops, respectively. These values can be used to estimate $l_t^i$ on those particular stops. Such estimations will be further used as support vectors to estimate the entire load profile for a given trip—together with the maximum load and the maximum load point of a given trip. This procedure C is detailed in the subsequent section:

In step C) the trip load profile is estimated. Given the loads computed for the first/last stops and the maximum load for a trip, the maximum load point (the stop for which a trip will experience the greatest load) has to be computed. One option is to select the stop with the maximum dwell time if this is sufficiently large to be considered a maximum (e. g. defined by a parameter). Otherwise, the stop which balances the sums of dwell times on the up/streams stops as equally as possible is selected. This value, along the loads computed for the first/last stops will give a support vector to proceed with a local regression procedure (through the LOESS algorithm as disclosed in the non-patent literature of Cleveland, W., Robust locally weighted regression and smoothing scatterplots. Journal of the American statistical association, Vol. 74, No. 368, 1979, pp. 829-836). This local regression procedure divides the route with subsections for which the loads can be explained through a linear function. Such procedure's output is then constrained by the vehicle's capacity as well as for the dwell times extracted from the data by defining confidence bounds for the loads on each stop on an incremental fashion. These bound's center depends on the prediction for the immediate previous stop while its range depends on the uncertainty around the dwell time on that stop as well. The regression output is then fitted to realistic values that meet the dwell times measured by the data.

In detail the load profile is estimated using constraint local regression: The load profile estimation is here for example proposed using Local Regression namely, Local Scatterplot Smoothing (LOESS) (13). The first step to perform such procedure is to obtain samples to support this regression analysis. Here these samples are the values of $l_t^i$, $\forall i \in \{1 \ldots s\}$ and the values of $l_t^i$ for the first/last stops are known. However, this is not enough to estimate the entire load profile. Hence, the eqs. (3,4) already provided a way to compute the maximum load. However, this is not sufficient to compute the maximum load point (i.e. the bus stop which experienced such maximum load).

The identification of the maximum load point $\tau(t)=i$ for a particular t without any passenger-based data is a difficult task. However, hereby we just want to understand the demand for each route on a general perspective on which are their typical values—instead of aiming to determine their exact values. Let $\theta$ denote the earliest bus stop which experienced the largest dwell time on a given trip (which can be defined as $dw_t^\theta$) then it can be computed as $$\theta = \operatorname*{argmax}_i (lo_t^i), \forall i \in \{1 \ldots s\}$$

Using these dwell times, the maximum load point of a given trip t, i.e. $\tau(t)$, can be computed as follows $$\tau(t) = \begin{cases} \min\{K\} \text{ where } k \in K: \sum_{i=1}^k lo_t^i \geq \sum_{i=1}^s \frac{lo_t^i}{2}, \forall k \in \{1 \ldots s\} & \text{if } lo_t^\theta < \chi \\ \theta & \text{otherwise} \end{cases}$$

The latest definition assumes that whenever a very large loading time is experienced, it is inevitably associated with a large amount of boardings, which results on a strong candidate for a maximum load point. The concept of large loading time is given by $\chi$, an user-defined parameter. If there is no suitable candidate for such maximum load point computation, the earliest bus stop which experienced so far more than half of the total sum of the loading times on the trip t.

After such computation, a set of loads is obtained denominated by a support vector, i.e. SV. This set contains the known load values which can be used the remaining loads. The definitions made by the previous assumption and eqs. (3,4) indicate that the load profile, i.e. lt* where $SV \subset l_t^*$ follows a parabola-like function—where its maximum is located at $\tau(t)$ (as much as $\tau(t)\sim s/2$). However, it is not possible to reasonably generalize this assumption to every trips. Consequently, an alternative solution to estimate the load profile shape (through the estimation of a function established as $l_t(i)$, $i\in\{1 \ldots s\}$) is needed—as its type (e.g. linear/polynomial or non-linear) is unknown.

LOESS is a regression method which combines linear/nonlinear regression methods on a simple fashion. Instead of trying to fit a linear/non-linear function globally (i.e. for all bus stops), it does it locally by fitting models to localized subsets of data to build up a function which can describe the deterministic part of the variation in the data, point by point (i.e. stop by stop). In simple terms, it just fits segments in the data (e.g. first/last stops using a simple linear function or a parabola around the maximum load point). The subsets of data are determined using a nearest neighbors algorithm, where the neighborhood concept is given by a bandwidth-type user-defined parameter, i.e. $\lambda$. Usually, the LOESS requires a large amount of data to perform accurate fits to the target function. Yet, the type of function is interesting and has to be found which describes each local—which can be roughly faced as the function's shape. The deterministic part of the function is then fitted using the dwell times—as it is further discussed below.

The first step (1) of the load profile estimation procedure is to fit a possible function to describe $l_t(i)$, i.e. $l'_t(i)$, using the LOESS method based on SV. The obtained absolute values are not that relevant as we are just interested on their first-order derivative (e.g. is the load going up or down in the next stop). The next two steps are on pruning the obtained results to the context of our trip: first (1), the regression output is constrained to the load range, i.e. $l_t^i \in [0, c]$, $\forall i \in \{1 \ldots s\}$ by dividing the regression output by its maximum value to then multiply it by c if $\exists i: l'_t(i)>c$. Then, the load values in $l'_t(i)$ are replaced by the ones in SV only for the stops which are part of the original support points (first/last stops and maximum load point).

Then the dwell times are fitted to the load profile using incremental filters which is described in the following: After estimating a constrained $l''_t(i)$ using the abovementioned procedure, their results have to kept adjusted using the dwell times computed through the recorded AVL data. To do it so, an incremental filter can e.g. be employed. This filter is defined stop-by-stop by using the load prediction obtained for the last stop. It settles on two components: (1) an bandwidth defining both the maximum/minimum admissible load values, i.e. $\eta_{max_t}, \eta_{min_t}$; and (2) a progression rate function to decompose the loading time into boardings and alightings, i.e. $\varrho_t^i$. They can be defined as follows:

$$\eta_{max_t}^i = \hat{l}_t(i-1) + \lceil dw_t^i/b \rceil; \eta_{min_t}^i = \hat{l}_t(i-1) - \lceil dw_t^i/a \rceil$$

$$\varrho_t^i = \begin{cases} 1 & \text{if } i = \phi_f \\ 0 & \text{if } i = \phi_l \\ \varrho_t^{i-1} - \dfrac{1}{\phi_l - \phi_f} & \text{otherwise} \end{cases}$$

where $\varphi_f, \varphi_l$ denote the first stop and the last stops which are not part of first/last stop sets, respectively $\{1 \ldots \lceil \varphi_f \cdot s \rceil\}$ and $\{s-\lceil \varphi_l \cdot s \rceil \ldots s\}$. Then, this can be used to define the last update to the load estimation function, i.e. $F_t(i)$, as follows $$\mathbb{F}_t(i) = \begin{cases} e(t, i) & \text{if } \phi_f < i < \phi_l \\ \hat{l}_t^i & \text{otherwise} \end{cases}$$

$$e(t, i) = \begin{cases} \eta_{min_t}^i + ((\eta_{max_t}^i - \eta_{min_t}^i) \times \varrho_t^i) + \\ \left[\left(1 - \dfrac{\hat{l}_t^i}{\hat{l}_t^{i-1}}\right) \times \dfrac{\eta_{max_t}^i - \eta_{min_t}^i}{2}\right] & \text{if } \phi_f < i < \phi_l \wedge i \neq \tau(t) \\ \hat{l}_t^i & \text{otherwise} \end{cases}$$

By performing this procedure, reasonable load values can be obtained regarding the dwell times computed using the AVL data. Yet, the information on the load trend is kept obtained through the local regression method—which results on a constrained local regression framework.

This computation is completely unsupervised since the real load values are not known. This issue also limits the computation of confidence intervals for predictions since sample/population-based standard deviations cannot be computed anyhow. To tackle such limitation an online procedure is proposed to compute a dwell-based load bandwidth which aims to illustrate the uncertainty around the load predictions on a graphical fashion (i.e. their values have no statistical value). It uses a sliding window of ω past bus stops to consider realistic minimum/maximum loads using their dwell times (e.g. if a=2 and $dw_t^i$=10, on a worst case scenario, $al_t^i$=5 may be experienced).

In step D the typical load profile is estimated. The previous estimations may be weak since every trip may exhibit distinct natures. However, the typical load of a period instead of a given trip may be provided as follows:

The law of large numbers is applied to calculate the mean profile of such a period. The mean load is computed on each stop given all the existing trip load estimations. Then the Euclidean distance is used to find the trip most similar to such profile to guarantee that the forecast for the load profile is realistic and feasible. This trip estimation is then selected as the best candidate representing the typical trip behavior within the selected period. Its load along their confidence interval is then provided. In other words first noisy trip load profiles for each trip are used.

Consequently, over- or underestimating the load profile may be present to many of the considered trips. In order to tackle such undesired phenomenon, e.g. it is proposed not to try to estimate each trip's load profile but only to find the typical load profile of a trip running a given route on a peak period of interest. To do so, the law of large numbers is applied by calculating the average load profile under such conditions using the mean load value for each bus stop. To guarantee that such load profile is realistic, the Euclidean Distance is computed between such average load profile and every considered trip. Finally, we select as typical trip the sample which is more similar to the average load profile (i.e. the one with the shortest Euclidean distance) is selected as typical trip.

In summary, at least one embodiment of the present invention provides inter alia: a multi-step procedure comprising a trip-load profile estimation method on which the observed dwell-times are fitted into demand expected through original scheduling processes. Difference between the expected dwell-time and the observed once are used to feed a local regression procedure. This enables employing a local regression to let the procedure find solution subspaces whose notes follow linear functions, for example constantly increasing/decreasing along N stops. The output of said procedure enables to define the load profile shape through the definition of a reliable explanatory function for the first-order derivative of the load profile. This output is then constrained by bounding it accordingly through available real dwell-time measurements for pairs (trip and stop) incrementally. The estimation of the typical boarding/deboarding time per passenger can be estimated using linear regression. Knowledge about the scheduling procedure for the timetable the definition of its meta-parameters may be used. Also the identification of the maximum trip's load point, etc. is enabled.

At least one embodiment of the present invention comprises the following steps:
1) Computing the real dwell times and the maximum loads points (e.g. components 3,4 in FIG. 1), along with the resulting constants (loading/alighting time per passenger and the dead time at stops);
2) Estimating each trip's load profile by
   a. Computing the boardings/alightings for the first/last stops using the output of 1).
   b. Using the output of 1) and 2a) as input of a local regression procedure which identifies the first-order derivative of the loads (e.g. component 5 in FIG. 1);
   c. Constraining the outputs of 2b) on an incremental procedure able to perform reliable estimations of the loads given the historical series of measured dwell times (e.g. component 6 in FIG. 1);
3) Computing the typical load profile for a peak hour (using the mean loads of every trip load estimations computed in 2).

At least one embodiment of the present invention comprises:
1) Using GPS data (1), along with a defined schedule (2), computed dwell times (3) and the maximum load points (4) to compute the typical vehicle's load on a given public transportation route during a peak hour period of interest (8);
2) Performing a load profile estimation method through a constrained local regression procedure (5). By doing a local regression procedure the first-order derivative of the loads (i.e. if they are going up or down) is identified through a particular subset of trips.
3) Performing an incremental procedure to fit the regression output to admissible values (6) starting from historical dwell times (3) along with the maximum load points (4). This incrementality follows the behavior of a vehicle (where the loads on a stop N are the loads of the stop N−1 plus the delta observed on N).

Embodiments of the present invention provide the advantage that load profiles can be provided without the need to invest in expensive automatic passenger collecting systems comprising cameras or weight measurement systems or the like leading to reduction of estimated 35% in costs with only a minor accuracy loss.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:
1. A method for determining a composite load profile of a vehicle, wherein the vehicle is configured to take a plurality of trips along a route, the route defines a plurality of stops, the vehicle pauses at each of the stops for a respective dwell time during each trip along the route, the vehicle defines a maximum passenger capacity, and the composite load profile indicates a composite passenger capacity utilization of the vehicle along the route;

the method comprising, for each of a plurality of trips along the route:
(a) collecting, with a computing system comprising one or more computing devices and from one or more sensors mounted to the vehicle, first data identifying a time-indexed location of the vehicle along the route during the trip;
(b) estimating, with the computing system and based on the collected first data, (i) a dwell time for each stop and (ii) at least one instance of a maximum load stop, a stop being designated as a maximum load stop at least when the vehicle, during the stop, is at the maximum passenger capacity; and
(c) computing, with the computing system, a load profile for the trip by
performing a local regression procedure in which the route is divided into subsections and capacity utilization of the vehicle between adjacent subsections is represented as a linear function of the estimated dwell times and the at least one maximum load stop;
the method further comprising computing, with the computing system, the composite load profile based on the plurality of computed trip load profiles.

2. The method according to claim 1, wherein timetable information representing parameters of historic and/or current timetables for the vehicle is included into vehicle scheduling information and each of the trip load profiles are computed based on the vehicle scheduling information.

3. The method according to claim 2, wherein the timetable information is generated by extracting meta parameters including one or both of desired vehicle occupancy and vehicle capacity.

4. The method according to claim 1, wherein the composite load profile of the vehicle indicates, for each of the stops along the route, a composite dwell time and the method comprises estimating, for each of the composite dwell times of the composite load profile, at least one of: a number of passenger boardings, a number of passenger deboardings, a boarding time, and a deboarding time for the vehicle.

5. The method according to claim 1, comprising estimating, during each instance of (b), the at least one maximum load stop for the trip based on the dwell time for each stop of the trip.

6. The method according to claim 1, wherein the local regression procedure is based on LOESS.

7. The method according to claim 1, comprising constraining, during each instance of (c), the linear function for the route based on a minimum desired passenger capacity of the vehicle.

8. The method according to claim 1, wherein for computing the composite load profile a Euclidean distance is computed between each of the multiple trip load profiles and an average load profile and the trip load profile having the smallest distance is selected as composite load profile.

9. The method according to claim 1, comprising estimating, for each of the plurality of trips, boarding time and deboarding time per passenger for a first and last stop of the trip based on the estimated dwell times and the estimated maximum load stop.

10. The method according to claim 1, comprising determining the composite load profile in a peak hour of interest.

11. A computing system comprising one or more computing devices, the computing system being for determining a composite load profile of a vehicle, wherein the vehicle is configured to take a plurality of trips along a route, the route defines a plurality of stops, the vehicle pauses at each of the stops for a respective dwell time during each trip along the route, the vehicle defines a maximum passenger capacity, and the composite load profile indicates a composite passenger capacity utilization of the vehicle along the route;

the computing system being configured to, for each of a plurality of trips along the route:
(a) collect, from one or more sensors mounted to the vehicle, first data identifying a time-indexed location of the vehicle along the route during the trip;
(b) estimate, based on the collected first data, (i) a dwell time for each stop and (ii) at least one instance of a maximum load stop, a stop being as the maximum load stop at least when the vehicle, during the stop, is at the maximum passenger capacity;
(c) compute a load profile for the trip by performing a local regression procedure in which the route is divided into subsections and capacity utilization of the vehicle between adjacent subsections is represented as a linear function of the estimated dwell times and the at least one maximum load stop;
the computing system being further configured to compute the composite load profile based on the plurality of computed trip load profiles.

12. The system according to claim 11, wherein the computing devices are adapted to operate in parallel.

13. The system according to claim 11, wherein the system is connected to one or more databases for providing route information and schedule information.

14. A non-transitory computer-readable medium comprising code, the code being configured to cause the computing system to perform the method of claim 1.

15. A non-transitory computer-readable medium comprising code, the code being configured to cause a computing system comprising one or more computing devices to determine a load profile of a vehicle, wherein the vehicle is configured to take a plurality of trips along a route, the route defines a plurality of stops, the vehicle pauses at each of the stops for a respective dwell time during each trip along the route, the vehicle defines a maximum passenger capacity, and the composite load profile indicates a composite passenger capacity utilization of the vehicle along the route;

the code being configured to cause the computing system to, for each of a plurality of trips along the route:
(a) collecting, from one or more sensors mounted to the vehicle, first data identifying a time-indexed location of the vehicle along the route during the trip;
(b) estimating (i) a dwell time for each stop and (ii) at least one instance of a maximum load stop, a stop being designated as a maximum load stop at least when the vehicle, during the stop, is at the maximum passenger capacity; and
(c) computing a load profile for the trip by performing a local regression procedure in which the route is divided into subsections and capacity utilization of the vehicle between adjacent subsections is represented as a linear function of the estimated dwell times and the at least one maximum load stop;
the code further being configured to cause the computing system to compute the composite load profile based on the plurality of computed trip load profiles.

* * * * *